United States Patent
Sutton-Sharp

(10) Patent No.: US 11,001,516 B2
(45) Date of Patent: May 11, 2021

(54) PROCESS FOR TREATING PRODUCED WATER FROM AN OIL AND GAS FIELD

(71) Applicant: SUEZ GROUPE, Paris la Defense (FR)

(72) Inventor: Emilie Sutton-Sharp, Paris (FR)

(73) Assignee: SUEZ GROUPE, Paris (FR)

( * ) Notice: Subject to any disclaimer, the term of this patent is extended or adjusted under 35 U.S.C. 154(b) by 58 days.

(21) Appl. No.: 16/063,510

(22) PCT Filed: Dec. 15, 2016

(86) PCT No.: PCT/EP2016/081121
§ 371 (c)(1),
(2) Date: Jun. 18, 2018

(87) PCT Pub. No.: WO2017/102909
PCT Pub. Date: Jun. 22, 2017

(65) Prior Publication Data
US 2018/0370833 A1     Dec. 27, 2018

(30) Foreign Application Priority Data

Dec. 18, 2015 (EP) .................................. 15201317

(51) Int. Cl.
*B01D 17/04* (2006.01)
*C02F 9/00* (2006.01)
(Continued)

(52) U.S. Cl.
CPC .............. *C02F 9/00* (2013.01); *B01D 17/045* (2013.01); *B01D 17/085* (2013.01); *C02F 1/04* (2013.01); *C02F 1/28* (2013.01); *C02F 1/40* (2013.01); *C02F 1/441* (2013.01); *C02F 1/442* (2013.01); *C02F 1/444* (2013.01); *C02F 1/445* (2013.01);
(Continued)

(58) Field of Classification Search
CPC .. B01D 17/046; B01D 17/085; B01D 17/045; C02F 1/04; C02F 1/28; C02F 1/40; C02F 1/441; C02F 1/442; C02F 1/444; C02F 1/445; C02F 1/52; C02F 1/72; C02F 2101/32; C02F 2101/325; C02F 2103/365; C02F 2301/046; C02F 9/00
See application file for complete search history.

(56) References Cited

U.S. PATENT DOCUMENTS 5,227,071 A     7/1993 Torline et al.
6,471,869 B1 *  10/2002 Yanou .................... B01D 61/14
                                              210/195.2
(Continued)

FOREIGN PATENT DOCUMENTS

EP      2 815 805 A1    12/2014
WO    2012/142204 A2    10/2012
(Continued)

OTHER PUBLICATIONS

International Search Report, dated Feb. 27, 2017, from corresponding PCT application No. PCT/EP2016/081121.

*Primary Examiner* — Pranav N Patel
(74) *Attorney, Agent, or Firm* — Nixon & Vanderhye

(57) ABSTRACT

A process of treating a liquid containing oil and solids, includes an ultra- or micro-filtration step followed by a coalescing step of the concentrate obtained from the filtering step by uses of a coalescing contactor.

11 Claims, 3 Drawing Sheets

(51) Int. Cl.
  *B01D 17/00*   (2006.01)
  *C02F 1/28*   (2006.01)
  *C02F 1/40*   (2006.01)
  *C02F 1/44*   (2006.01)
  *C02F 1/52*   (2006.01)
  *C02F 1/72*   (2006.01)
  *C02F 101/32*   (2006.01)
  *C02F 103/36*   (2006.01)
  *C02F 1/04*   (2006.01)

(52) U.S. Cl.
  CPC ............... *C02F 1/52* (2013.01); *C02F 1/72* (2013.01); *C02F 2101/32* (2013.01); *C02F 2101/325* (2013.01); *C02F 2103/365* (2013.01); *C02F 2301/046* (2013.01)

(56) References Cited

U.S. PATENT DOCUMENTS

| | | |
|---|---|---|
| 9,840,903 B2 | 12/2017 | Smith |
| 2009/0056940 A1 | 3/2009 | Minnich et al. |
| 2010/0264068 A1* | 10/2010 | Ikebe ................. C02F 9/00 208/391 |
| 2012/0255904 A1 | 10/2012 | Nagghappan |
| 2013/0206690 A1 | 8/2013 | Bauerle et al. |
| 2013/0334137 A1 | 12/2013 | Seibert et al. |
| 2014/0131279 A1 | 5/2014 | Seibert et al. |
| 2014/0262254 A1* | 9/2014 | Smith ................. E21B 43/40 166/267 |
| 2014/0374352 A1 | 12/2014 | Brantley et al. |

FOREIGN PATENT DOCUMENTS

| | | |
|---|---|---|
| WO | 2013/152268 A1 | 10/2013 |
| WO | 2013/188837 A1 | 12/2013 |
| WO | 2013/188849 A1 | 12/2013 |
| WO | 2014/133619 A1 | 9/2014 |
| WO | 2014/151242 A1 | 9/2014 |

* cited by examiner

PROCESS FOR TREATING PRODUCED WATER FROM AN OIL AND GAS FIELD

BACKGROUND OF THE INVENTION

Field of the Invention

The present invention concerns a process for treating produced water from an oil & gas field.

Description of the Related Art

The exploration and production of oil and gas generates a large quantity of water. The world average is 3 barrels of water for each barrel of oil produced and this ratio increases over the lifetime of the producing wells.

In mature oil fields where the reservoir pressure has reduced to the point that oil cannot be produced from the reservoir naturally, the oil needs to be removed by injecting a substance into the reservoir to displace oil towards a producing well and maintain reservoir pressure. Water is used as an injection fluid because it is immiscible with oil and will displace it, allowing more oil to be recovered from the reservoir. This process is known as Enhanced Oil Recovery (EOR) and more specifically:

water flooding if only water is injected in the oil bearing formation,
chemical EOR when water and chemicals are injected,
low salinity EOR when low salinity water is injected and
steam EOR when water is injected as steam.

The water source for the enhanced oil recovery process can be aquifer water, surface water, seawater or recycled produced water. To reduce their environmental footprint and their water management costs, Oil & Gas companies are increasingly looking at reusing produced water for injection in the oil bearing formation. This option requires a comprehensive treatment process to avoid plugging the reservoir and the injection equipment with the undesired compounds contained in the produced water such as suspended solids, oil and scale forming dissolved solids.

Water management economics in Oil & Gas fields show that the most significant cost relates to the handling and disposal of by-products because it involves transportation, storage, underground injection and/or landfilling. To design a cost competitive solution to treat produced water it is therefore necessary to minimize the final by-product volumes due to be disposed of. The by-products of a produced water treatment line typically include an oily sludge stream generated by the pretreatment step concentrating the oil and suspended solids and a brine stream generated by the polishing step concentrating the dissolved solids.

Today several pretreatment methods exist to remove suspended solids and oil from produced water but they exhibit one or several of the following drawbacks:

High volumes of byproducts are generated inducing high operating costs,
Oil is not fully removed from the produced water generating a plugging problem during EOR reinjection or a fouling problem in the produced water polishing steps,
Robustness is not ensured due to sensitivity to suspended solids or oil.

Flotation devices are commonly used to remove oil and solids from the produced water. To allow a good oil-water separation, high dosing rates of coagulant aid chemicals are needed which are costly and produce a coagulated sludge as byproduct. Oil in the coagulated sludge is not recovered which induces a revenue loss for the Oil & Gas operator. The dewatering and transportation of the coagulated sludge generates high operating costs.

Liquid/Liquid coalescing devices are used to coalesce and recover oil from oil-water mixtures. The liquid/liquid mixture typically enters the tubular coalescing element and flows inside to outside. This Dead-End In-Out coalescence process makes this technology very sensitive to suspended solids and therefore not robust to recover oil from produced water.

Both the Flotation and Coalescence processes are unable to fully remove oil from the produced water. The treated effluent contains oil residuals that might generate a problem in the downstream polishing steps or during reinjection in the hydrocarbon bearing reservoir.

Ultrafiltration (UF) and Microfiltration (MF) membranes, unlike the two previous technologies, remove more than 99% of the water insoluble oil in the feed stream producing a high quality treated effluent. However, the UF and MF membranes generate an oily concentrate as a by-product that is 10 to 20 times more concentrated in oil and suspended solids than the feed water. To minimize the volume of by-product generated, the oily concentrate can be recirculated back to the upstream oil-water separation step where the oil and suspended solids can be separated. This option induces the following technical problem: the shear created by the recirculation induces an emulsification of the oil droplets contained in the concentrate, which leads to a poor separation in the upstream separation device. The emulsified oil droplets that were poorly removed in the pretreatment step tend to accumulate in the membrane feed stream and lead to membrane fouling.

Numerous solutions have been proposed to overcome one or several drawbacks of the known methods.

WO 2014/151242 discloses a process for treating produced water by precipitating hardness compounds and directing the produced water to a ceramic membrane to remove oil, suspended solids and precipitated hardness and chemically treating the permeate to inject it back in the oil-bearing formation to enhance the recovery of oil. UF permeate may be directed to softening ion exchange resins for further hardness removal. In order to increase the viscosity of the UF permeate, a polymeric compound may be added to the UF permeate.

WO 2012/142204 discloses a method of treating produced water by reducing hardness by chemically softening the produced water, raising the pH over 10.5, directing the effluent to a mixing tank to cause crystallization, directing the produced water to a filtration membrane, directing the membrane permeate to an ion exchange unit to conduct further softening, directing the ion exchange effluent to a reverse osmosis membrane to remove dissolved solids.

WO 2013/188837 concerns a non-dispersive process for insoluble oil recovery from liquid sources. A method of recovering one or more oils from a liquid using one or more membrane or membrane contactors, comprising the steps of: pumping the liquid comprising the one or more oils into contact with a first surface of the one or more membranes or membrane contactors; coalescing the one or more oils from the liquid onto the first surface of the one or more membrane or membrane contactors; and collecting a stream of coalesced oil from the second surface of the one or more membrane or membrane contactors, wherein the stream comprises the oils without the need for a counter flowing recovery fluid.

WO 2014/133619 is directed to a method improving oil quality using a microporous hollow fiber membrane pretreated with a soak in an hydrophobic liquid which improves the useful life-time and performance of said membrane.

WO/2013188849 discloses a system for separating oil from water and particulate contaminants from a oil/water/solid mixture, comprising (i) a solid removal system for removing small, medium and large solids from a oil/water/solid mixture to form a oil and water stream containing only solids and (ii) a membrane contactor system for separating the oil from the water in the oil and water stream, wherein the oil coalesces at a first surface of the membrane contactor and is collected at the second surface of the membrane contactor and the solids in the stream are small enough to flow into the membrane contactor.

US/2014131279 discloses an apparatus for removing oil from an oil-containing liquid comprising oil and gas comprising a source of oil-containing liquid and a membrane contactor system in fluid communication with the source of oil-containing liquid, the membrane contactor system comprising one or more membrane contactors having a first and a second surface, wherein the first surface coalesces oil and removes gas from the oil-containing liquid, and the oil and gas are collected on the second surface from the oil-containing liquid.

However all these methods have still many drawbacks and there is still a need for an improved method to remove oil and suspended solids from produced water from an oil and gas field.

BRIEF SUMMARY OF THE INVENTION

The present invention solves the above mentioned technical problems with the following improvements:
- an Ultrafiltration (UF) or Microfiltration (MF) membrane system is used to produce an oil-free effluent that will not contain any oil residuals that could affect the downstream polishing step or the injection process,
- to avoid an oil accumulation in the UF or MF membrane feed stream due to the recirculation of the concentrate, the concentrate is sent to an out-in tubular or hollow fiber coalescing contactor that allows the coalescence of the emulsified oil droplets from the shell side of the contactor to the tube side of the contactor. The oil free concentrate coming out of the shell side of the coalescing contactor is sent back to the upstream pretreatment step,
- oil is recovered as a pure oil stream from the tube side of the coalescing contactor to avoid any revenue loss for the Oil & Gas operator,
- to avoid plugging to occur in the coalescing contactor due to the presence of suspended solids in the concentrate, the coalescence is run in an out-in crossflow configuration which means that the concentrate is injected on the shell side of the coalescing contactor and the oil coalescence process occurs in a crossflow mode from the outside to the inside of the tubular or hollow fiber coalescing media.

Thus the invention relates to a method to remove oil and suspended solids from produced water from an oil and gas field to reuse it as feed stream for reinjection in the oil bearing formation or to discharge it to a surface water body.

The present invention relates to a process for treating a liquid containing oil and solids, especially a produced water from an oil and gas field containing oil and solids said method comprising a first step of ultra- or micro-filtration of the liquid followed by a second step of coalescing a concentrate obtained from said first step by mean of a coalescing contactor for obtaining at least a deoiled concentrate containing suspended solids.

With the process according to the invention, the treated liquid is deoiled and oil is recovered as a pure oil stream from the tube side of the coalescing contactor.

According to the invention, "a liquid containing oil and solids" encompasses liquids containing any of the following in any combination: insoluble oils (hydrocarbons and hydrocarbon-rich molecules of commercial value) that are produced by oil fields, or products from oil fields, including mixed oil-water streams. As an example of said liquid is "produced water" which is a term used to designate the water that is produced as a byproduct along with the oil and gas.

The term "oil" as used herein refers to a single hydrocarbon or hydrocarbon-rich molecule including a complex mixture of lipids, hydrocarbons, free fatty acids, triglycerides, aldehydes, etc. The term «oil» also includes, e.g., C8 (jet fuel compatible), C60 (motor oil compatible) and oils that are odd- or even-chain oils (and mixtures thereof), e.g., from C6 to C120. Oil also comprises hydrophobic or lipophilic compounds.

According to the invention, the terms "ultrafiltration" is referred to a physical filtration process using a membrane which retains the particles of size upper than 0.01 μm and "microfiltration" is referred to a physical filtration process using a membrane which retains the particles of size upper than 0.1 μm.

According to the invention the term "concentrate" refers to the part of a liquid stream containing the particles which cannot pass through a filtration membrane.

According to the invention, the coalescing step is a process whereby two or more emulsion droplets become joined together forming larger droplets with the ultimate separation of the emulsion into two phases (oil and water). The driving force for emulsion coalescence is the thinning and disruption of the liquid film between the droplets. This can happen if the emulsion droplets closely approach each other in a cream layer, in a floc, or during Brownian diffusion. When the droplets approach each other very closely, the liquid film between them undergoes some fluctuation, and when the film thickness h approaches a critical value hcr, film collapse occurs resulting in its rupture. Alternatively, the surface of the droplets may undergo some fluctuation resulting in the formation of waves. The van der Waals attraction at the apex of these waves becomes sufficiently strong, and eventually, the waves join.

According to the invention, the coalescing contactor may be in an in-out configuration or in an out-in configuration.

A coalescing contactor in an out-in configuration comprises one or more hydrophobic membranes or membrane modules on the surface of which the one or more oils in the aqueous stream coalesce. The coalesced oil accumulates within the tube volume and flows out of the module. The hydrophobic membrane or membrane module comprises microporous hollow fiber membranes, selected from polyethylene, polypropylene, Polytetrafluoroethylene (PTFE), polyolefins, polyvinyl chloride (PVC), amorphous polyethylene terephthalate (PET), polyolefin copolymers, poly (etheretherketone) type polymers, surface modified polymers, mixtures or combinations thereof. The surface modified polymers comprise polymers modified chemically at one or more halogen groups or by corona discharge or by ion embedding techniques.

The coalescence of the concentrate induces cost reduction. Indeed, produced water passed through the first step of ultrafiltration or microfiltration and thus resulted into a concentrate (almost 10 times concentrated) and a deoiled permeate (pure water). However the concentrate contains oil and small amount of water and/or suspended solids. Thus, the concentrate of an ultrafiltration or microfiltration step is not pure oil.

The coalescence through a coalescing contactor allows recovering pure oil out of the second step as a permeate and a deoiled concentrate. If the produced water was sent directly to a coalescing contactor, the surface of coalescing contactor to be used would have been much higher than the surface needed for coalescing a concentrate of an ultra/micro-filtration device. If the produced water was only sent to an ultra/micro-filtration device, the oil recovered would not have been pure inducing revenue losses.

In a first embodiment of the invention, the liquid containing oil and solids is selected from at least one of oily water, oil industry waste streams, oil contaminated water or brine, wastewater, contaminated oil, oil containing drainage water, water contaminated with oil, seawater contaminated with oil, brine contaminated with oil, industrial effluents that comprise oil, natural effluents that comprise oil, drilling mud, tailing ponds, leach residue, produced water, oil sands tailing, frac water, connate water, an oil/water/solid mixture, a gravity separated oil/water/solid mixture, water-oil mixtures, aqueous slurries, oil-water mixture from an oil-bearing formation.

In a second embodiment of the invention, the first step of the process comprises obtaining a backwash wastewater and further comprises a third step of directing said backwash wastewater to the coalescing contactor (104).

The term "backwash wastewater" means a wastewater obtained by the membrane backwashing process, i.e. a process pumping water backward through the membrane to remove trapped solid particles.

In a third embodiment, after the fourth step the oil is recovered as a pure oil stream.

In another embodiment, the process comprises before the first step an upstream pretreatment to allow primary separation of the suspended solids and oil. The upstream pretreatment would be preferably a step of gravitational separation by using, for example, hydrocyclone or tank for decantation. The upstream pretreatment is not a step of ultra/micro-filtration.

In another embodiment, the process comprises further after the second step, a fourth step of recirculating the deoiled concentrate and/or backwash wastewater containing suspended solids from the coalescing contactor back to the upstream pretreatment step to allow separation of the suspended solids.

In another embodiment, the process comprises further after the third step, a fifth step of recirculating the deoiled concentrate and/or backwash wastewater containing suspended solids from the coalescing contactor back to the upstream pretreatment step to allow separation of the suspended solids.

In yet another embodiment when the liquid containing oil and solids is an oil-water mixture from an oil-bearing formation then the process comprises further a sixth step selected from:
  injecting the permeate of the ultrafiltration or microfiltration membrane free of suspended solids and oil back in the oil bearing formation,
  directing the permeate of the ultrafiltration or microfiltration membrane free of suspended solids and oil to a polishing step before injection in the oil bearing formation and
  directing the permeate of the ultrafiltration or microfiltration membrane free of suspended solids and oil to a polishing step before discharging it to a surface water body.

According to the invention, the polishing step is well known from the one skilled in the art and may be selected from a nanofiltration step, a reverse osmosis step, a forward osmosis step, a precipitation step, evaporation/crystallization step, oxidation step, disinfection step, or an adsorption step.

Preferred embodiments of the invention are disclosed in following description and the accompanying drawings which are merely illustrative of such invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

DETAILED DESCRIPTION OF THE PREFERRED EMBODIMENTS

Figure 1:
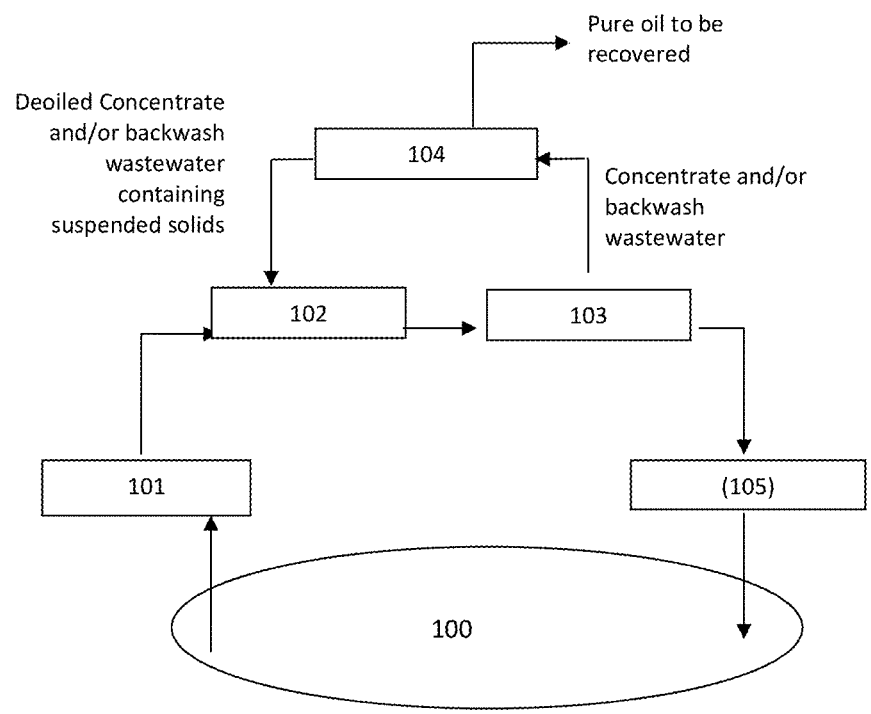
FIG. 1 is a schematic illustration of one embodiment of the process of the present invention.

FIG. 1 is a schematic illustration of one embodiment of the process of the present invention. The oil-water mixture from an oil-bearing formation (100) is pumped by the production well (101); the pumping may be realised by all methods of pumping, propelling, or feeding fluid from one location to another employing hoses, lines, tubes ducts, pipes, or pipelines including under pressure. It also includes gravity flow of fluid; said mixture is submitted to a primary oil/water separation step (102) in order to discard parts of the solid particles and the bulk oil; such step may be processed by gravity separation or separated by other methods, e.g., flotation, centrifugation and the like. The collected liquid of step (102) is passed in a first step on an Ultrafiltration or Microfiltration membrane (103); the membrane are either ceramic membrane like silicon carbide (SiC), titanium dioxide ($TiO_2$), zirconium dioxide ($ZrO_2$), aluminum oxide ($Al_2O_3$) or polymeric material like polyacrylonitrile (PAN), polyvinylidene difluoride (PVDF), polytetrafluoroethylene (PTFE), polyethersulfone (PES) and surface modified polymers. The concentrate or the backwash waste water are respectively directed in a second or a third step to the coalescing contactor (104) from which pure oil is recovered whereas the deoiled concentrate and/or backwash wastewater containing suspended solids are returned respectively in a fourth and a fifth step to the primary separation step (102) and treated as described before. The filtrate from the passing through an Ultrafiltration or Microfiltration membrane is returned back through an injection well (105) into the oil-bearing formation (100).

Figure 2:
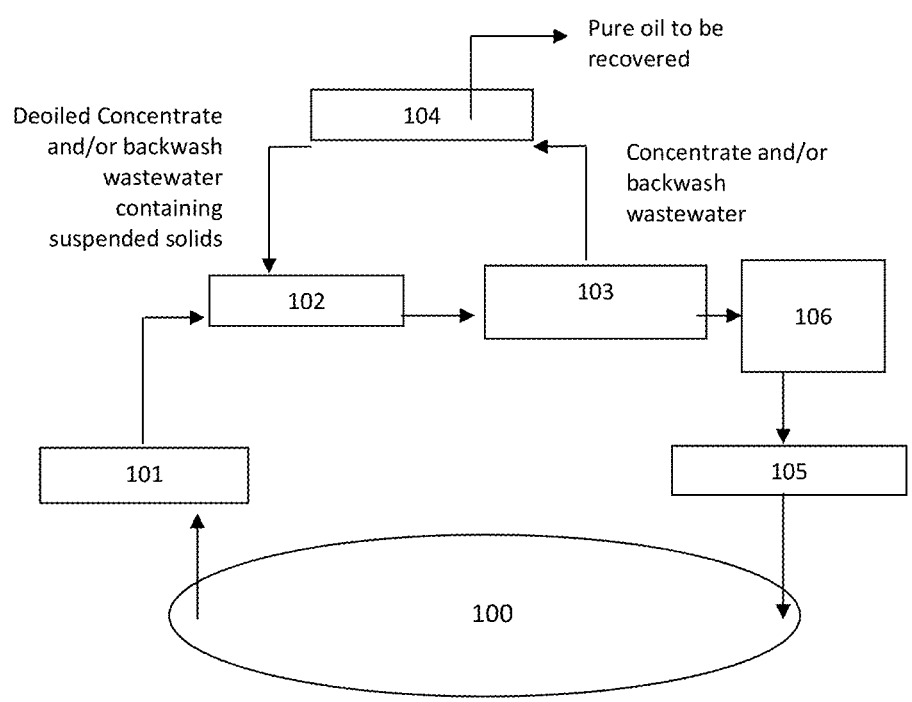
FIG. 2 is a schematic illustration of a second embodiment of the process of the present invention.

FIG. 2 is a schematic illustration of a second embodiment of the process of the present invention. The steps are identical to those described in FIG. 1 except that the filtrate from the passing through an Ultrafiltration or Microfiltration membrane is submitted in a sixth step to a polishing treatment (106) before returning back through an injection well (105) into the oil-bearing formation (100). The polishing treatment is processed by any methods, for example oxidation, chemical reduction, pH adjustment, carbon filtering or filtration through sand (calcium carbonate) or fabric filters, disinfection, membrane filtration, thermal treatment, adsorption or combination thereof.

Figure 3:
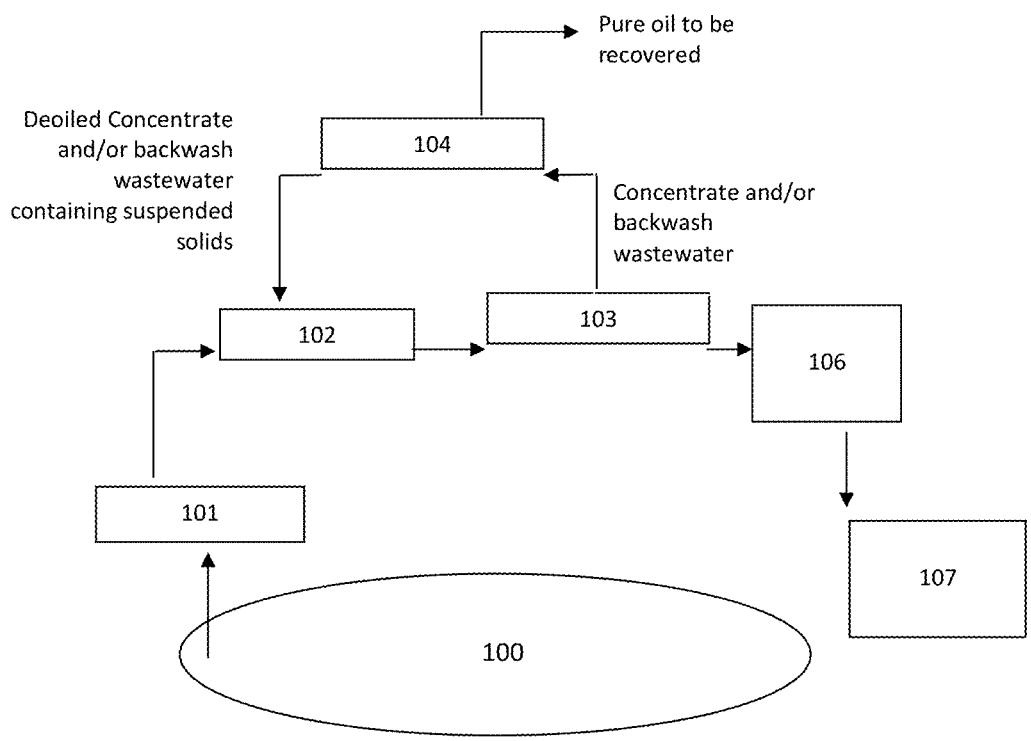
FIG. 3 is a schematic illustration of a third embodiment of the process of the present invention.

FIG. 3 is a schematic illustration of a third embodiment of the process of the present invention. The steps are identical to those described in FIG. 2 except that the filtrate from the passing through an Ultrafiltration or Microfiltration membrane submitted to a polishing treatment (106) is discharged to surface water body (107).

The method according to the invention removes more than 99% of the non-polar oil (ie water insoluble oil) from the feed stream and recovers more than 80% of the non-polar oil (ie water insoluble oil) as pure oil stream from the UF/MF concentrate.

Moreover the produced water devoid of undesired compounds contained in the produced water such as suspended solids and oil may be used for injection in the oil bearing formation leading to lower operating expenses.

The intervention claimed is:

1. A process for treating a produced water from an oil and gas field containing oil and solids, said process comprising:
   obtaining the produced water comprising the oil and the solids;
   submitting the produced water to a primary oil/water separation to discard parts of solid particles and bulk oil to obtain collected liquid;
   passing the collected liquid on an ultra- or micro- filtration membrane to obtain a concentrate by ultra- or micro-filtration of the produced water;
   directing the obtained concentrate to coalesce by an out-in tubular or hollow fiber coalescing contactor configured to obtain at least a deoiled concentrate and comprising one or more hydrophobic membranes or hydrophobic membrane modules, the coalescing running in an out-in crossflow configuration in the out-in tubular or hollow fiber coalescing contactor, the obtained concentrate being injected on a shell side of the coalescing contactor and the coalescing occurs in a crossflow mode from outside to inside of the tubular or hollow fiber coalescing contactor; and
   recirculating the obtained deoiled concentrate containing suspended solids from the coalescing contactor to resubmit the obtained deoiled concentrate to another oil/water separation.

2. The process according to claim 1, wherein the produced water from the oil and gas field containing oil and solids is selected from at least one of oily water, oil industry waste streams, oil contaminated water or brine, wastewater, contaminated oil, oil containing drainage water, water contaminated with oil, seawater contaminated with oil, brine contaminated with oil, industrial effluents that comprise oil, natural effluents that comprise oil, drilling mud, tailing ponds, leach residue, produced water, oil sands tailing, frac water, connate water, an oil/water/solid mixture, a gravity separated oil/water/solid mixture, water-oil mixtures, aqueous slurries, and oil-water mixture from an oil-bearing formation.

3. A process for treating a produced water from an oil and gas field containing oil and solids, said process comprising:
   obtaining the produced water comprising the oil and the solids;
   submitting the produced water to a primary oil/water separation to discard parts of solid particles and bulk oil to obtain collected liquid;
   passing the collected liquid on a ultra- or micro- filtration membrane to obtain a concentrate by ultra- or micro-filtration of the produced water, the obtaining the concentrate comprising obtaining a backwash wastewater by a membrane backwashing process in which water is pumped backward through the ultra- or micro-filtration membrane;
   directing the obtained concentrate to coalesce by an out-in tubular or hollow fiber coalescing contactor configured to obtain at least a deoiled concentrate and comprising one or more hydrophobic membranes or hydrophobic membrane modules, the coalescing running in an out-in crossflow configuration in the out-in tubular or hollow fiber coalescing contactor, the obtained concentrate being injected on a shell side of the coalescing contactor and the coalescing occurs in a crossflow mode from outside to inside of the tubular or hollow fiber coalescing contactor;
   recirculating the obtained deoiled concentrate containing suspended solids from the coalescing contactor to resubmit the obtained deoiled concentrate to another oil/water separation; and
   directing said backwash wastewater to the coalescing contactor.

4. The process according to claim 3, further comprising:
   directing the backwash wastewater to the coalescing contactor obtained during the obtaining the concentrate; and
   recirculating the backwash wastewater containing suspended solids from the coalescing contactor back to resubmit the backwash wastewater to an oil/water separation.

5. The process according to claim 1, wherein the produced water from the oil and gas field containing oil and solids is an oil-water mixture from an oil-bearing formation, and
   wherein the process further comprises one or more of:
      injecting a permeate of the ultrafiltration or microfiltration free of suspended solids and oil back in the oil bearing formation,
      directing a permeate of the ultrafiltration or microfiltration free of suspended solids and oil to polishing before injecting in the oil bearing formation, and
      directing a permeate of the ultrafiltration or microfiltration free of suspended solids and oil to a polishing before discharging the permeate to a surface water body.

6. The process according to claim 5, wherein the polishing is selected from one or more of a nanofiltration step, a reverse osmosis step, a forward osmosis step, a precipitation step, evaporation/crystallization step, oxidation step, disinfection step, and an adsorption step.

7. The process according to claim 2, wherein the obtaining the concentrate comprises obtaining a backwash wastewater by a membrane backwashing process in which water is pumped backward through the ultra- or micro-filtration membrane to remove trapped solid particles, and
   the process further comprises directing said backwash wastewater to the coalescing contactor.

8. The process according to claim 2, wherein the produced water from the oil and gas field containing oil and solids is an oil-water mixture from an oil-bearing formation, and wherein the process further comprises one or more of:
- injecting a permeate of the ultrafiltration or microfiltration free of suspended solids and oil back in the oil bearing formation,
- directing a permeate of the ultrafiltration or microfiltration free of suspended solids and oil to polishing before injecting in the oil bearing formation, and
- directing a permeate of the ultrafiltration or microfiltration free of suspended solids and oil to a polishing before discharging the permeate to a surface water body.

9. The process according to claim 3, wherein the produced water from the oil and gas field containing oil and solids is an oil-water mixture from an oil-bearing formation, and
wherein the process further comprises one or more of:
- injecting a permeate of the ultrafiltration or microfiltration free of suspended solids and oil back in the oil bearing formation,
- directing a permeate of the ultrafiltration or microfiltration free of suspended solids and oil to polishing before injecting in the oil bearing formation, and
- directing a permeate of the ultrafiltration or microfiltration free of suspended solids and oil to a polishing before discharging the permeate to a surface water body.

10. The process according to claim 4, wherein the produced water from the oil and gas field containing oil and solids is an oil-water mixture from an oil-bearing formation, and
wherein the process further comprises one or more of:
- injecting a permeate of the ultrafiltration or microfiltration free of suspended solids and oil back in the oil bearing formation,
- directing a permeate of the ultrafiltration or microfiltration free of suspended solids and oil to polishing before injecting in the oil bearing formation, and
- directing a permeate of the ultrafiltration or microfiltration free of suspended solids and oil to a polishing before discharging the permeate to a surface water body.

11. The process according to claim 10, wherein the polishing is selected from one or more of a nanofiltration step, a reverse osmosis step, a forward osmosis step, a precipitation step, evaporation/crystallization step, oxidation step, disinfection step, and an adsorption step.

* * * * *